(12) United States Patent
Choudhury et al.

(10) Patent No.: US 8,600,370 B2
(45) Date of Patent: Dec. 3, 2013

(54) SYSTEMS AND METHODS FOR MAINTAINING CONSTANT CLOSED SUBSCRIBER GROUP CELL RESELECTION RADIUS

(75) Inventors: Sayantan Choudhury, Vancouver, WA (US); Kenneth James Park, Cathlamet, WA (US); Ahmad Khoshnevis, Portland, OR (US)

(73) Assignee: Huawei Technologies Co., Ltd., Shenzhen (CN)

( * ) Notice: Subject to any disclaimer, the term of this patent is extended or adjusted under 35 U.S.C. 154(b) by 1188 days.

(21) Appl. No.: 12/264,846

(22) Filed: Nov. 4, 2008

(65) Prior Publication Data
US 2010/0112998 A1 May 6, 2010

(51) Int. Cl.
*H04W 4/00* (2009.01)

(52) U.S. Cl.
USPC ........ 455/422.1; 455/561; 455/436; 455/522; 455/525; 455/450; 370/328; 370/338; 370/335; 370/342

(58) Field of Classification Search
USPC .............. 455/422.1, 444, 522, 501, 561, 525, 455/450; 370/328, 338, 335, 342
See application file for complete search history.

(56) References Cited

U.S. PATENT DOCUMENTS

| | | | |
|---|---|---|---|
| 7,092,710 B1 | 8/2006 | Stoter et al. | |
| 7,324,827 B2 | 1/2008 | Pedraza et al. | |
| 8,032,142 B2 * | 10/2011 | Carter et al. | 455/444 |
| 2007/0042799 A1 * | 2/2007 | Jubin et al. | 455/522 |
| 2009/0042593 A1 * | 2/2009 | Yavuz et al. | 455/522 |
| 2009/0221295 A1 * | 9/2009 | Sahin et al. | 455/450 |
| 2009/0279519 A1 * | 11/2009 | Brisebois et al. | 370/338 |

FOREIGN PATENT DOCUMENTS

| | | |
|---|---|---|
| JP | 2007-068007 A | 3/2007 |
| WO | 2008/093100 A2 | 8/2008 |

OTHER PUBLICATIONS

3GPP TR 25.820 V8.2.0, "3G Home NodeB Study Item Technical Report (Release 8)," Sep. 2008.
NEC, "E-UTRA Inter-Frequency & Inter-RAT Cell Reselection," R2-073383, Aug. 2007.
Qualcomm Europe, "Intra-Frequency Cell Reselection Restriction in Case of Macro/CSG Cells Mixed Carrier," R2-084061, Aug. 2008.
Qualcomm Europe, "Parameter for HNB White List Cell Selection," R2-084552, Aug. 2008.
International Search Report issued for International Patent Application No. PCT/JP2009/069145 on Jan. 19, 2010.
3GPP TS 36.300 V8.1.0, "Evolved Universal Terrestrial Radio Access (E-UTRA) and Evolved Universal Terrestrial Radio Access Network (E-UTRAN)," Jun. 2007.
Sharp, "Problems associated with using a constant CSG offset when performing reselection ranking," R2-085107, Sep. 2008.
3GPP TS 36.304 V8.2.0, "User Equipment (UE) procedures in idle mode," May 2008.
"COST Hata model," http://en.wikipedia.org/wiki/COST_Hata_model, Nov. 3, 2008.
3GPP TSG-RAN WG2 Meeting #63bis, Prague, Czech Republic, Sep. 29-Oct. 3, 2008, "Comparisons of Methods on Obtaining CSG Qoffset(s)", R2-085124.

* cited by examiner

*Primary Examiner* — Kiet Doan
*Assistant Examiner* — Michael T Vu
(74) *Attorney, Agent, or Firm* — Slater & Matsil, L.L.P.

(57) ABSTRACT

A method for self-configuration of offset factors between two base stations in a wireless communications system is described. A first offset factor is sent to a first user equipment (UE) by a first base station. An offset factor is an indication of the reselection area around a home evolved nodeB (HeNB). A second offset factor is received from a second UE. The first offset factor is modified using the second offset factor. The modified first offset factor is sent to the first UE.

37 Claims, 11 Drawing Sheets

SYSTEMS AND METHODS FOR MAINTAINING CONSTANT CLOSED SUBSCRIBER GROUP CELL RESELECTION RADIUS

TECHNICAL FIELD

The present disclosure relates generally to communications and wireless communications systems. More specifically, the present disclosure relates to systems and methods for maintaining constant closed subscriber group cell reselection radius.

BACKGROUND

The 3rd Generation Partnership Project, also referred to as "3GPP," is a collaboration agreement that aims to define globally applicable Technical Specifications and Technical Reports for 3rd Generation Systems. 3GPP Long Term Evolution (LTE) is the name given to a project to improve the Universal Mobile Telecommunications System (UMTS) mobile phone or device standard to cope with future requirements. The 3GPP may define specifications for the next generation mobile networks, systems, and devices. In one aspect, UMTS has been modified to provide support and specification for the Evolved Universal Terrestrial Radio Access (E-UTRA) and Evolved Universal Terrestrial Radio Access Network (E-UTRAN). In 3GPP LTE a mobile terminal or device is called a "user equipment" (UE). A base station may be referred to as an evolved NodeB (eNodeB). A semi-autonomous base station/femto-cell may be referred to as a home eNodeB (HeNB).

A UE may have an established connection with either an eNodeB or an HeNB. A UE may reselect an HeNB or an eNodeB for the connection using an offset factor. For example, a UE may reselect an HeNB or an eNodeB for the connection using a Q Factor. The concept of using a Q Factor in reselection of an HeNB or an eNodeB is proposed in the current standard 3GPP-LTE Release 8. Using a constant Q Factor throughout a cell may result in different transmission ranges for each HeNB in the cell. Improvements may be realized by achieving uniform transmission range for every HeNB in the cell.

DETAILED DESCRIPTION

Figure 1:
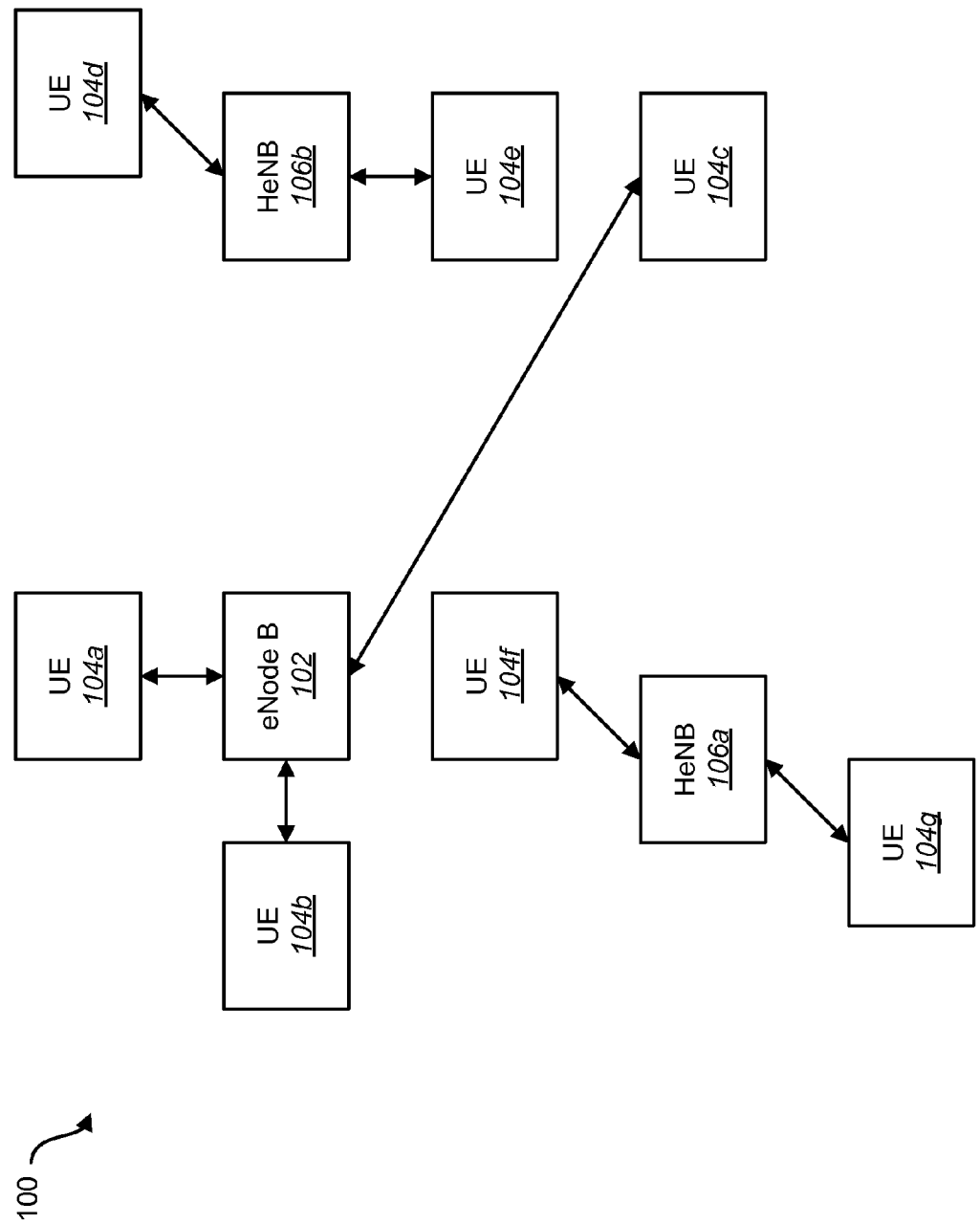
FIG. 1 illustrates a wireless communication system in which the present systems and methods may be practiced.

A method for self-configuration of offset factors between two base stations in a wireless communications system is disclosed. A first offset factor is sent to a first user equipment (UE) by a first base station. An offset factor is an indication of the reselection area around a home evolved nodeB (HeNB). A second offset factor is received from a second UE. The first offset factor is modified using the second offset factor. The modified first offset factor is sent to the first UE.

The first offset factor may be a first Q Factor, and the second offset factor may be a second Q Factor. The first base station may be an HeNB. The first Q Factor may be an indication of the reselection area around the first base station. The second UE may receive the second Q Factor from an evolved NodeB (eNodeB). The second Q Factor may be an indication of the reselection area around the first base station.

The second UE may receive the second Q Factor from a second base station when the second UE subscribed to the second base station. Receiving the second Q Factor from the second UE may occur after the second UE begins subscribing to the first base station.

The second UE may receive the second Q Factor from a second base station over the broadcast channel when the second UE subscribes to the first base station and periodically monitors the second base station while subscribing to the first base station.

The second UE may receive the second Q Factor from a second base station. The second base station may be an HeNB. The second Q Factor may be an indication of the reselection area around the second base station. The reselection area may be reestablished around the first base station using the modified first Q Factor.

The first base station may be an evolved NodeB (eNodeB). The first Q Factor may be an indication of the reselection area around an HeNB within the eNodeB cell. The second Q Factor may be received from the HeNB. The second Q Factor may be an indication of the reselection area around the HeNB.

The first UE may subscribe to the first base station. The second UE may subscribe to a second base station.

The method may further comprise waiting a specified amount of time before modifying the first Q Factor using the second Q Factor. Modifying the first Q Factor using the second Q Factor may comprise using a combination of the first Q Factor and the second Q Factor to obtain an updated. Q Factor.

A method for adaptive pilot power transmission to maintain a constant range for home evolved NodeBs (HeNBs) in a cell is disclosed. An offset factor and the HeNB pilot power are used to establish a reselection area around an HeNB. An offset factor is an indication of the reselection area around the HeNB. The path loss between the HeNB and an evolved NodeB (eNodeB) is estimated. The HeNB pilot power is updated to maintain a constant reselection range for HeNBs in a cell using the estimated path loss.

The eNodeB pilot signal may be detected. The interference that a user equipment (UE) will receive due to the eNodeB pilot signal may be deduced. The interference may be used to estimate the path loss between the HeNB and the eNodeB.

A connection may be maintained with one or more user equipments (UEs) that subscribe to the HeNB and are within the reselection area of the HeNB. The separation distance between the HeNB and the eNodeB may be received from the one or more UEs. The separation distance between the HeNB and the eNodeB may be used to estimate the path loss between the HeNB and the eNodeB.

The received eNodeB signal strength may be received from the one or more UEs. The received eNodeB signal strength may be used to estimate the path loss between the HeNB and the eNodeB.

A base station for use in a wireless communications system is disclosed. The base station includes a processor and memory in electronic communication with the processor. Executable instructions are stored in the memory. A first offset factor is sent to a first user equipment (UE). An offset factor is an indication of the reselection area around a home evolved nodeB (HeNB). A second offset factor is received from a second UE. The first offset factor is modified using the second offset factor. The modified first offset factor is sent to the first UE.

A home evolved NodeB (HeNB) for use in a wireless communications system is disclosed. The home evolved NodeB includes a processor and memory in electronic communication with the processor. Executable instructions are stored in the memory. A Q Factor and the HeNB pilot power are used to establish a reselection area around the HeNB. A Q Factor is an indication of the reselection area around the HeNB. The path loss between the HeNB and an evolved NodeB (eNodeB) is estimated. The HeNB pilot power is updated to maintain a constant reselection range for HeNBs in a cell using the estimated path loss.

The present systems and methods may operate independent of the physical layer access technology used by the wireless network. Examples of access technologies include orthogonal frequency division multiplexing (OFDM), frequency division multiple access (FDMA), time division multiple access (TDMA), and code division multiple access (CDMA). In addition, the present systems and methods may operate independent of whether the system is full or half duplex.

For purposes of example, the present systems and methods are described in terms of 3GPP LTE systems. However, the present systems and methods may be utilized for other communication systems such as IEEE 802.16(e, m), WiMAX systems, and other systems where the use of semi-autonomous base stations is warranted.

FIG. 1 illustrates a wireless communication system 100 in which the present systems and methods may be practiced. A mobile station may be referred to as user equipment (UE) 104. In a cellular wireless communication system 100, the central base station may be an evolved NodeB (eNodeB) 102. An eNodeB 102 may be in wireless communication with one or more UEs 104 (which may also be referred to as mobile stations, user devices, communications devices, subscriber units, access terminals, terminals, etc.).

The eNodeB 102 may handle the actual communication across a radio interface, covering a specific geographical area in the vicinity of the eNodeB 102, which is referred to as a cell. Depending on sectoring, one or more cells may be served by the eNodeB 102, and accordingly the eNodeB 102 may support one or more UEs 104 depending on where the UEs 104 are located. A UE 104 may have an established connection with the eNodeB 102 or a home eNodeB (HeNB) 106. When a UE 104 has an established connection with an eNodeB 102, it may be said that the UE 104 subscribes to the eNodeB 102. When a UE 104 has an established connection with an HeNB 106, it may be said that the UE 104 subscribes to the HeNB 106. A UE 104 that subscribes to an eNodeB 102 or an HeNB 106 may have several operating modes. For example, a UE 104 may operate in either idle mode or connected mode.

A UE 104 that operates in idle mode is not assigned any data channel resources on which to broadcast data to the base station that the UE subscribes to. However, a UE 104 that operates in idle mode may monitor the broadcast channels of a cell. A UE 104 that is operating in idle mode within a cell is said to be camped on a cell. When a UE 104 that is operating in idle mode switches from subscribing to one base station to subscribing to another base station, the process is called reselection.

A UE 104 that operates in connected mode is assigned data channel resources on which the UE 104 is allowed to transmit data to and receive data from the cell. When a UE 104 is operating in connected mode with an eNodeB 102, the UE 104 may select a different cell to transmit data to/receive data from. This process is called a handover or a handoff.

In one configuration, the eNodeB 102 provides a 3GPP (Release 8) Long Term Evolution (LTE) air interface and performs radio resource management for the communication system 100. In addition to the cell structure, 3GPP allows small regions within a cell that are controlled by semi-autonomous base stations known as home eNodeBs (HeNBs) 106. An HeNB 106 may also be referred to as a femto-cell. An HeNB 106 may be in electronic communication with one or more UEs 104 that are part of a private group known as a Closed Subscriber Group (CSG). A UE 104 may subscribe to an HeNB 106 or to an eNodeB 102. The UEs 104 that are part of the CSG may switch from subscribing to an eNodeB 102 to subscribing to an HeNB 106 associated with the CSG when circumstances warrant the switch. As discussed above, this switch may be referred to as a reselection. The UEs 104 may also switch from subscribing to an HeNB 106 to subscribing to an eNodeB 102 when circumstances warrant the switch.

A wireless communication system 100 may include more than one eNodeB 102 and more than one HeNB 106. Additionally, a wireless communication system 100 may include more than one UE 104.

The eNodeB 102 may be in electronic communication with one or more UEs 104. The eNodeB 102 may transmit data to the UEs 104 and receive data from the UEs 104 over a radio frequency (RF) communication channel. Likewise, an HeNB 106 may be in electronic communication with one or more UEs 104. The HeNB 106 may also transmit data to the UEs 104 and receive data from the UEs 104 over an RF communication channel. An eNodeB 102 may be in electronic communication with one or more HeNBs 106 using wired or wireless means. Likewise, an HeNB 106 may be in electronic communication with one or more eNodeBs 102 using wired or wireless means. Alternatively, an HeNB 106 may only communicate with an eNodeB 102 through a core network. Although 3GPP (Release 8) LTE does not support a direct wireless connection between an eNodeB 104 and an HeNB 106, support for this connection may become possible in future 3GPP LTE releases.

It may be preferable that a UE 104 subscribes to an HeNB 106, as opposed to an eNodeB 102, provided that the UE 104 belongs to the CSG of the particular HeNB 106. The procedure whereby a UE 104 switches from subscribing to an HeNB 106 to an eNodeB 102 may be referred to as a handover or handoff when the UE 104 is in connected mode. A handover may require the assistance of the core network. A UE 104 may be in connected mode when the UE 104 is sending or receiving voice or data. The procedure whereby a UE 104 in idle mode switches from subscribing to an eNodeB 102 to subscribing to an HeNB 106 or from subscribing to an HeNB 106 to subscribing to an eNodeB 102 may be referred to as a reselection.

Figure 2:
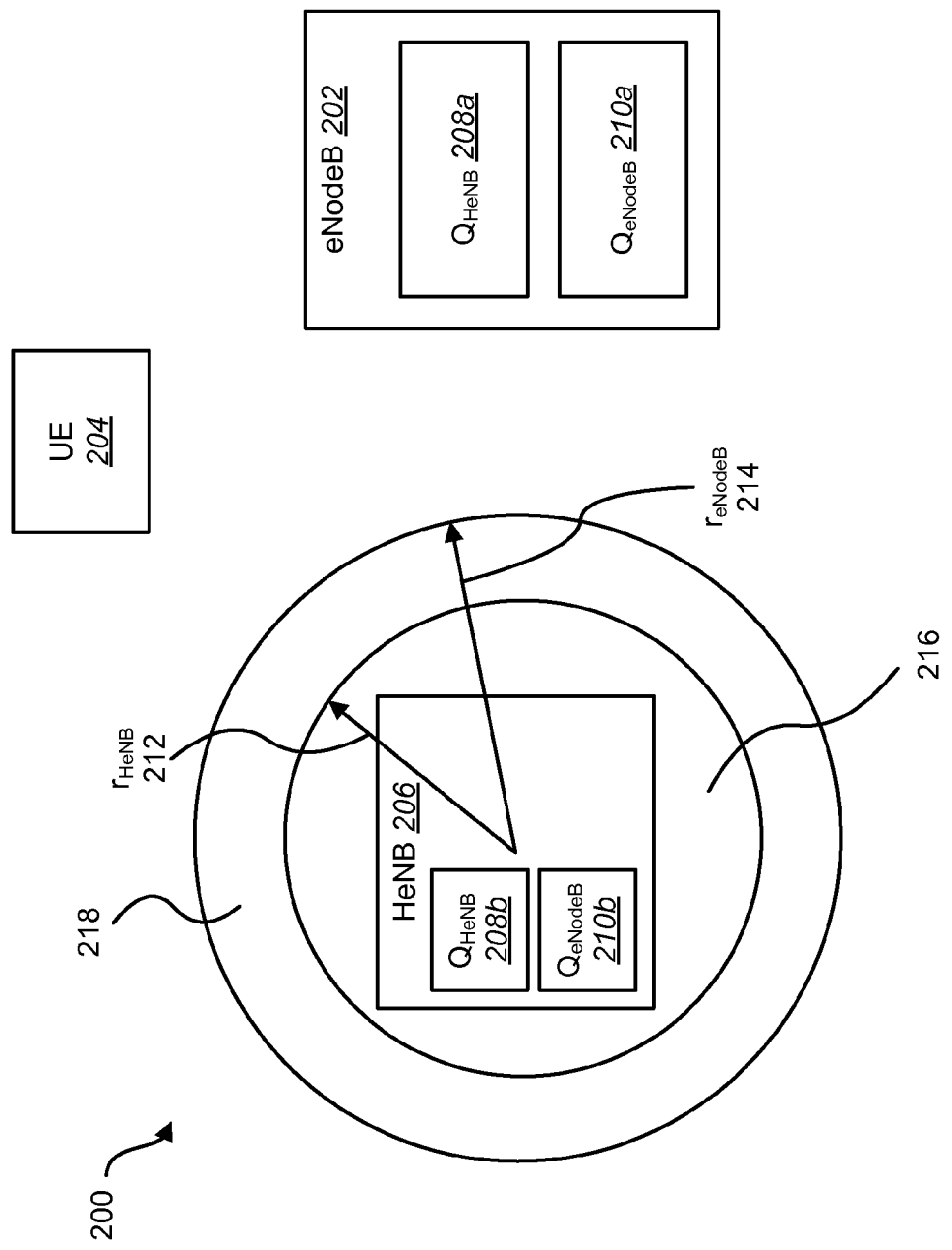
FIG. 2 illustrates a block diagram of a wireless communication system in which a reselection by a UE from an HeNB to an eNodeB or from an eNodeB to an HeNB may occur.

FIG. 2 illustrates a block diagram of a wireless communication system 200 with an eNodeB 202, a UE 204, and an HeNB 206. The HeNB 206 may define a reselection area 216 around the HeNB 206. The eNodeB 202 may also define a reselection area 218 around the HeNB 206. The HeNB 206 and the eNodeB 202 may define different areas of reselection around the HeNB 206. It may be preferable for the HeNB 206 and the eNodeB 202 to define the same area of reselection around the HeNB 206. The wireless communication system 200 may include more than one HeNB 206.

An HeNB 206 may be at the center of a circle with a radius $r_{HeNB}$ 212. The area within the circle with radius $r_{HenB}$ 212 may be referred to as the HeNB reselection area 216. The HeNB reselection area 216 may define the distance between an HeNB 206 and a UE 204 where reselection is desirable. For example, a UE 204 may camp on the eNodeB 202 when the UE 204 is outside the HeNB reselection area 216. When the UE 204 moves inside the HeNB reselection area 216, it may be warranted for the UE 204 to reselect or switch from subscribing to the eNodeB 202 to subscribing to the HeNB 206. Likewise, when the UE 204 moves from inside the HeNB reselection area 216 to outside the HeNB reselection area 216, it may be warranted for the UE 204 to reselect from subscribing to the HeNB 206 to subscribing to the eNodeB 202. In practice, the regions around an eNodeB or HeNB may be of arbitrary shape described via contours with constant RSSI/RSRP, and the selection/reselection regions may be dependent on the RSSI or RSRP at a given location. Although 3GPP (Release 8) LTE does not provide for a UE 204 to switch from subscribing to an eNodeB 202 to subscribing to an HeNB 206 when the UE 204 is in connected mode, future 3GPP releases may allow this functionality.

The UE 204 may determine when reselection is warranted by using an offset factor. An offset factor is an indication of the reselection area around an HeNB. For example, the UE 204 may determine when reselection is warranted by using an offset factor such as a Q Factor. The Q Factor may be an offset factor specific to the 3GPP LTE air interface standard. The Q Factor may assist the UE 204 in determining whether the UE 204 is within the HeNB reselection area 216. A UE 204 may use an older Q Factor if the Q Factor on the UE 204 has not yet been updated. The Q Factor may be an internal parameter for each HeNB 206. A UE 204 may receive an updated Q Factor $Q_{HeNB}$ 208b from the HeNB 206 upon reselection to the HeNB 206. Reselection may be warranted when $RSSI_{HeNB}$+ $Q \geq RSSI_{eNB}$ where $RSSI_{HeNB}$ is the received signal strength indicator (RSSI) at the UE 204 from the HeNB 206 (in dB) and $RSSI_{eNB}$ is the RSSI at the UE 204 from the eNodeB 202 (in dB). In place of RSSI, which is the measurement taken on a frequency, reselection may also be based on the reference signal received power (RSRP), which is the measurement taken on a cell. The RSRP may be used in place of the RSSI for all of the calculations below. The RSSI and the RSRP may be indications of the signal strength received by a UE 204. The Q Factor may also be a number in dB. The Q Factor may be dependent on the location of an HeNB 206 within a cell rather than being constant throughout a cell.

An eNodeB 202 may also store a Q Factor for each HeNB 206, $Q_{eNodeB}$ 210a. The eNodeB 202 may store a unique Q Factor for each HeNB 206 within the cell. The eNodeB 202 and an HeNB 206 may each use a different Q factor to define the reselection area around an HeNB 206. If the eNodeB 202 and an HeNB 206 do not coordinate the Q Factors used, the eNodeB 202 and the HeNB 206 may each define different areas of reselection around the HeNB 206. Thus, an HeNB 206 may have two areas of reselection, the first area of reselection 216 may be the area within a first radius $r_{HeNB}$ 212 of the HeNB 206. The first area of reselection 216 may be defined by $Q_{HeNB}$ 208b. The second area of reselection 218 may be the area within a second radius $r_{eNodeB}$ 214 of the HeNB 206. The second area of reselection 218 may be defined by $Q_{eNodeB}$ 210a.

A UE 204 may subscribe to either an HeNB 206 or an eNodeB 202. At the time of subscription, a UE 204 may receive the Q factor from the HeNB 206 or the eNodeB 202. For example, when a UE 204 begins subscribing to the HeNB 206, the UE 204 may receive $Q_{HeNB}$ 208b from the HeNB 206. Likewise, when the UE 204 begins subscribing to the eNodeB 202, the UE 204 may receive $Q_{eNodeB}$ 210a from the eNodeB 202.

If $Q_{HeNB}$ 208b and $Q_{eNodeB}$ 210a are not coordinated, a UE 204 may constantly switch between subscribing to the HeNB 206 and the eNodeB 202 or a coverage gap may exist. The HeNB 206 defines the area of reselection 216 around the HeNB 206 using radius $r_{HeNB}$ 212, which is dependent on the Q Factor $Q_{HeNB}$ 208b. The eNodeB 202 defines the area of reselection 218 around the HeNB 206 using radius $r_{eNodeB}$ 214, which is dependent on the Q Factor $Q_{eNodeB}$ 210a. A UE 204 that subscribes to the eNodeB 202 may use the Q Factor $Q_{eNodeB}$ 210a and a UE 204 that subscribes to the HeNB 206 may use the Q Factor $Q_{HeNB}$ 208b.

If the radius $r_{eNodeB}$ 214 is larger than the radius $r_{HeNB}$ 212, a UE 204 that subscribes to the eNodeB 202 may switch to or reselect the HeNB 206 upon entering the radius $r_{eNodeB}$ 214. If the UE 204 is within range of the HeNB 206 after reselection, the UE 204 may receive $Q_{HeNB}$ 208b from the HeNB 206. If the UE 204 is within the radius $r_{eNodeB}$ 214 but outside of the radius $r_{HeNB}$ 212, the UE 204 may then switch to or reselect the eNodeB 202. If the UE 204 is outside of the range of the HeNB 206 but within the radius $r_{eNodeB}$ 214, the UE 204 may be in a coverage gap, where the UE 204 is not subscribing to either the HeNB 206 or the eNodeB 202.

To avoid the constant reselection and/or UE 204 coverage gap, $Q_{HeNB}$ 208b and $Q_{eNodeB}$ 210a may be coordinated. The HeNB 206 may be unable to sense a transmission of $Q_{eNodeB}$ 210a from the eNodeB 202. Likewise, the eNodeB 202 may be unable to sense a transmission of $Q_{HeNB}$ 208b from the HeNB 206. Use of the core network to coordinate $Q_{HeNB}$ 208b and $Q_{eNodeB}$ 210a may cause an unnecessary burden on the core network. The eNodeB 202 and the HeNB 206 may coordinate $Q_{HeNB}$ 208b and $Q_{eNodeB}$ 210a autonomously without relying on the core network.

Figure 3:
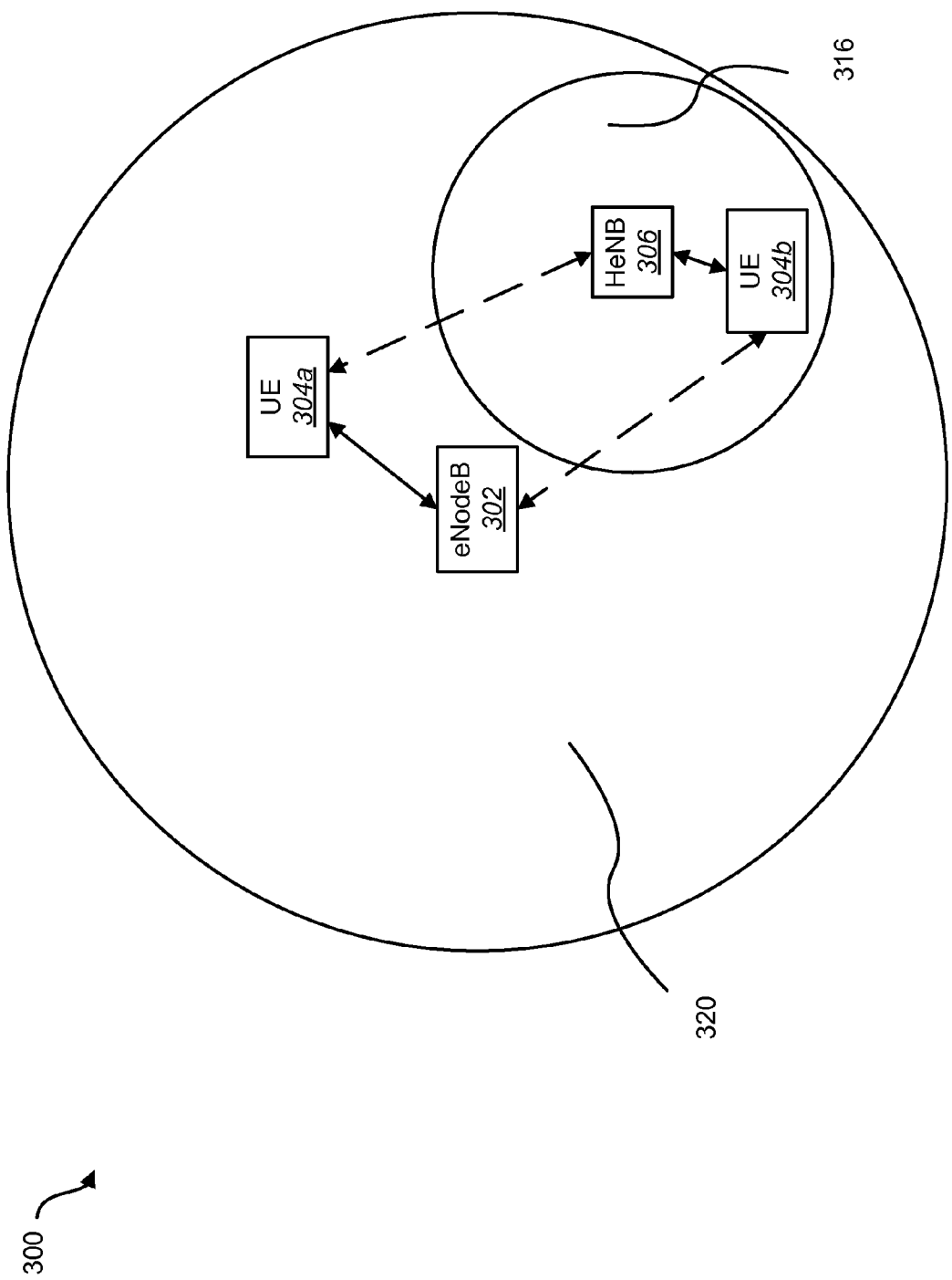
FIG. 3 is a block diagram of a wireless communication system with an eNodeB, an HeNB, and two UEs.

FIG. 3 is a block diagram of a wireless communication system 300 with an eNodeB 302, an HeNB 306, and two UEs 304. A first UE 304a may subscribe to an eNodeB 302 and a second UE 304b may subscribe to an HeNB 306. The second UE 304b may be within the reselection area 316 of the HeNB 306. The HeNB 306 may be located within the cell 320 of the eNodeB 302. The first UE 304a may be capable of receiving signals from both the eNodeB 302 and the HeNB 306. Likewise, the second UE 304b may be capable of receiving signals from both the HeNB 306 and the eNodeB 302. Thus, the first UE 304a and the second UE 304b may each be capable of receiving $Q_{eNodeB}$ 210a from the eNodeB 302 and $Q_{HeNB}$ 208b from the HeNB 306.

Because the first UE 304a subscribes to the eNodeB 302, the first UE 304a may use $Q_{eNodeB}$ 210a as the Q Factor. However, the first UE 304a may have received $Q_{HeNB}$ 208b from the HeNB 306. For example, the first UE 304a may have previously subscribed to the HeNB 306, such that the first UE 304a may have received $Q_{HeNB}$ 208b from the HeNB 306. Alternatively, the first UE 304a may periodically tune away from the eNodeB 302 to an HeNB 306 to measure the signal strength. The first UE 304a may tune away from the eNodeB 302 to the HeNB 306 by temporarily switching from subscribing to the eNodeB 302 to subscribing to the HeNB 306. While tuned away from the eNodeB 302, the first UE 304a may receive $Q_{HeNB}$ 208b from the HeNB 306 over the broadcast channel. The first UE 304a may store $Q_{HeNB}$ 208b on the first UE 304a. The first UE 304a may modify/update the Q Factor that the first UE 304a uses upon receiving $Q_{HeNB}$ 208b. The first UE 304a may send $Q_{HeNB}$ 208 to the eNodeB 302 based on a request from the eNodeB 302, on a periodic basis, or other kind of triggering.

Because the second UE 304b subscribes to the HeNB 306, the second UE 304b may use $Q_{HeNB}$ 208b as the Q Factor. The second UE 304b may receive $Q_{eNodeB}$ 210a from the eNodeB 302. For example, the second UE 304b may periodically tune away from the HeNB 306 to an eNodeB 302 or another HeNB and measure the signal strength. While tuned away from the HeNB 306, the second UE 304b may receive $Q_{eNodeB}$ 210a from the eNodeB 302 or other HeNB over the broadcast channel. Alternatively, the second UE 304b may have previously subscribed to the eNodeB 302, such that the second UE 304b may have previously received $Q_{eNodeB}$ 210a from the eNodeB 302. The second UE 304b may modify/update the Q Factor used by the second UE 304b upon receiving $Q_{eNodeB}$ 210a. The second UE 304b may store $Q_{eNodeB}$ 210a and forward $Q_{eNodeB}$ 210a to the HeNB 306.

In 3GPP (Release 8) LTE, a UE that subscribes to a base station may only be capable of sending information to that base station. However, in future releases of 3GPP LTE, a UE 304 that subscribes to a base station may be capable of sending information to other nearby base stations such as an HeNB 306 and/or an eNodeB 302.

Once the eNodeB 302 has received $Q_{HeNB}$ 208 from the first UE 304a, the eNodeB 302 may use $Q_{HeNB}$ 208 to modify/update $Q_{eNodeB}$ 210. Alternatively, the eNodeB 302 may receive the modified/updated Q Factor from the first UE 304a. Likewise, once the HeNB 306 has received $Q_{eNodeB}$ 210 from the second UE 304b, the HeNB 306 may use $Q_{eNodeB}$ 210 to modify/update $Q_{HeNB}$ 208. Alternatively, the HeNB 306 may receive the modified/updated Q Factor from the second UE 304b. Both the eNodeB 302 and the HeNB 306 may use a timer-based interrupt to decide the time frame where Q Factor feedbacks are received from UEs 304. The eNodeB 302 and the HeNB 306 may also use a timer-based interrupt to decide the time at which the current Q Factors will be updated.

Figure 4:
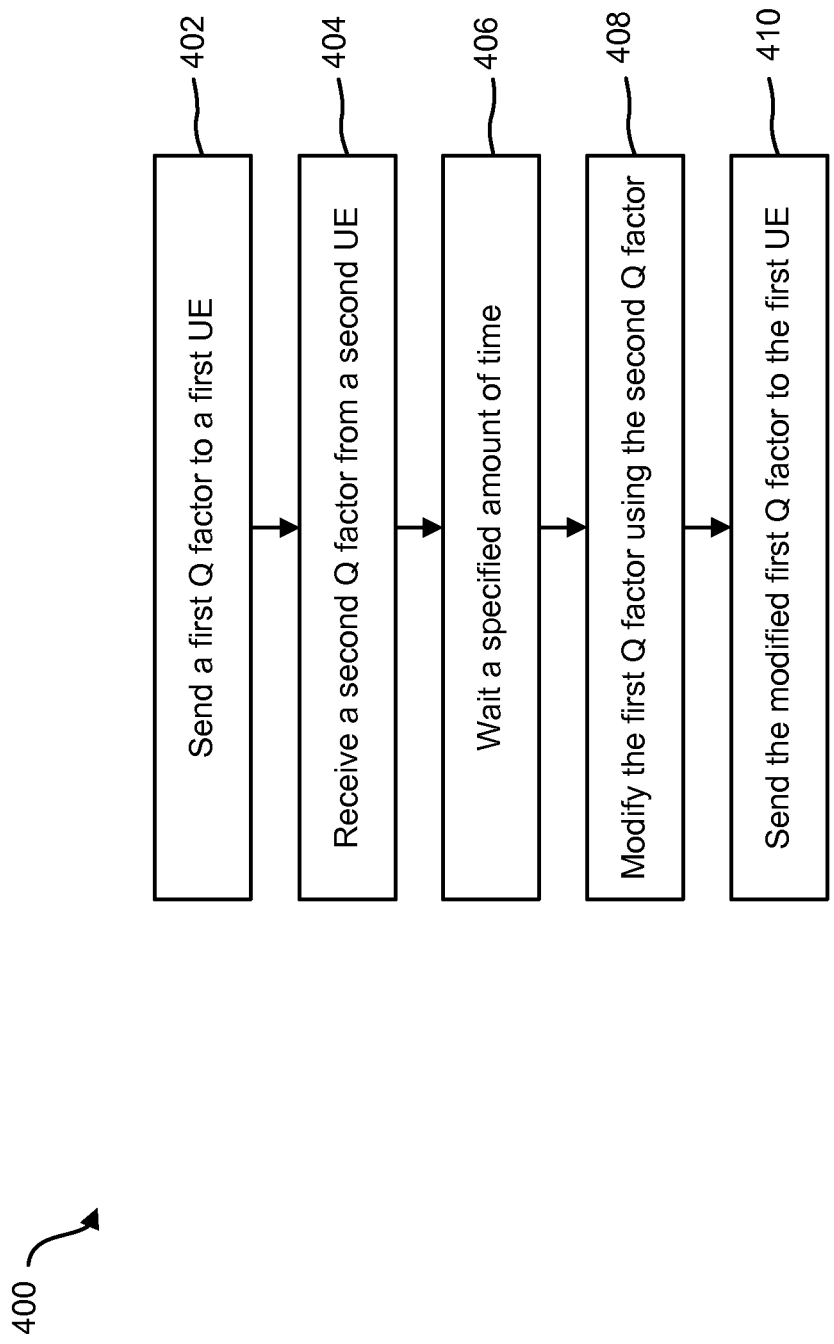
FIG. 4 is a flow diagram illustrating a method for self-configuration of Q Factors between two base stations in a wireless communications system.

FIG. 4 is a flow diagram illustrating a method 400 for self-configuration of Q Factors between two base stations in a wireless communications system. One or both of the base stations may be an HeNB 306. The method 400 for self-configuration of Q Factors may thus be used to configure the Q Factors between neighboring HeNBs 306. One of the base stations may be an eNodeB 302. A first base station may send 402 a first Q Factor to a first UE 304. The first Q Factor may be used to define the reselection area for an HeNB 306. If the first base station is an eNodeB 302, the first Q Factor may define the reselection area for a nearby HeNB 306. If the first base station is an eNodeB 302, the first base station may have several Q Factors, where each Q Factor relates to an HeNB 302 within the eNodeB cell 320.

The first base station may send 402 the first Q Factor to the first UE 304 over the broadcast channel. Alternatively, the first base station may send 402 the first Q Factor to the first UE 304 using dedicated signaling. The first UE 304 may subscribe to a second base station. The first base station may then receive 404 a second Q Factor from a second UE 304. The second UE 304 may subscribe to the first base station. The first base station may then wait 406 a specified amount of time. After the first base station has waited for the specified amount of time, the first base station may modify 408 the first Q Factor using the second Q Factor. The first base station may then send 410 the modified first Q Factor to the first UE 304.

Figure 5:
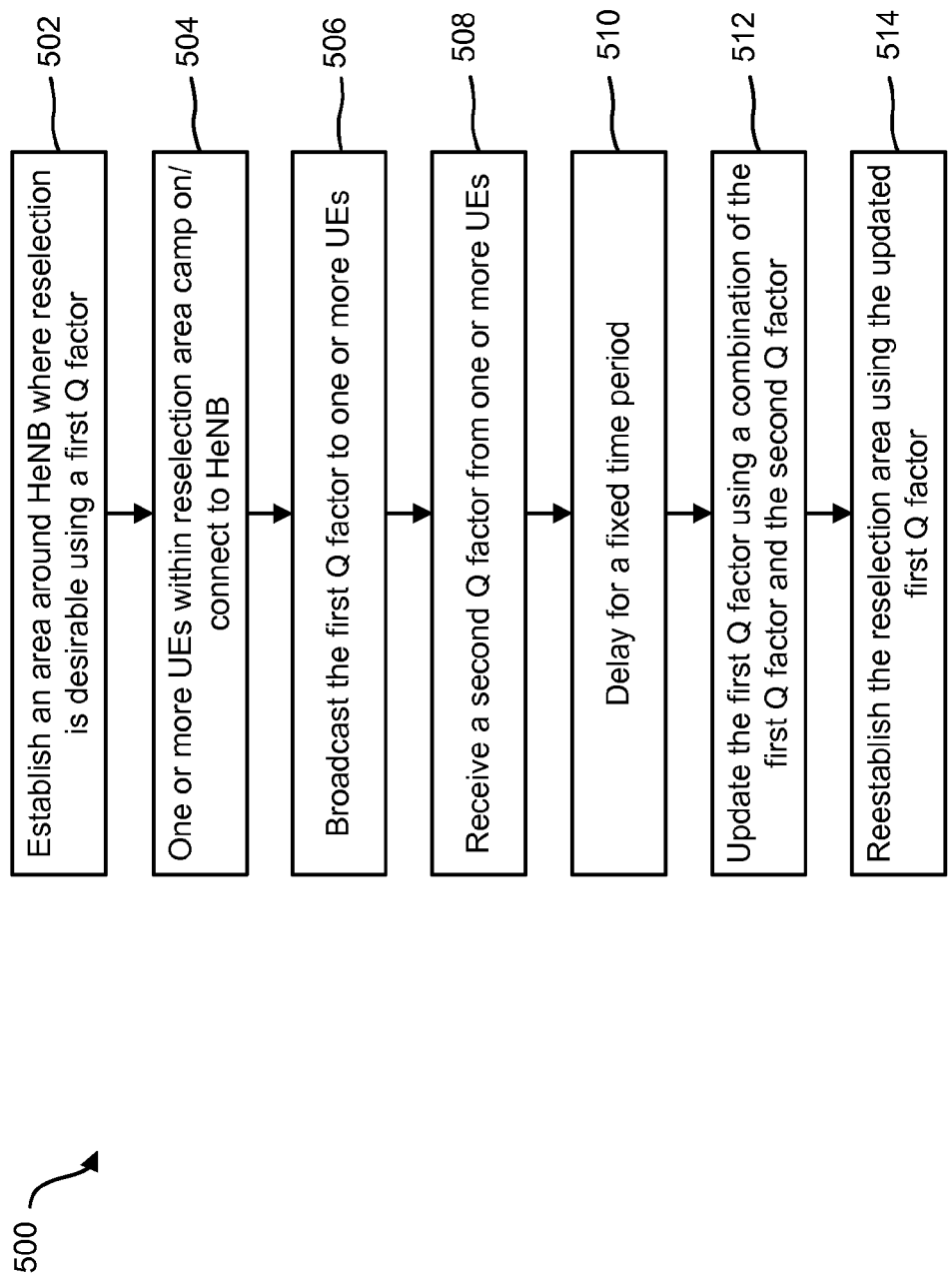
FIG. 5 is a flow diagram of a method for self-configuration of Q Factors between an HeNB and an eNodeB.

FIG. 5 is a flow diagram of a method 500 for self-configuration of Q Factors between an HeNB 306 and an eNodeB 302. The HeNB 306 may establish 502 an area 316 around the HeNB 306 where reselection to the HeNB 306 is desirable using a first Q Factor. One or more UEs 304 that are within the established reselection area 316 may subscribe to the HeNB 306.

The HeNB 306 may then broadcast 506 the first Q Factor to one or more UEs 304. The HeNB 306 may broadcast 506 the first Q Factor to one or more UEs 304 that subscribe to the HeNB 306. Additional UEs besides the UEs 304 that subscribe to the HeNB 306 may also receive the broadcasted first Q Factor. The first Q Factor may include an indication of the source of the Q Factor. For example, the first Q Factor may include information that links the first Q Factor to the HeNB 306.

The HeNB 306 may explicitly send the first Q Factor to a UE 304 at the time the UE 304 begins to subscribe the HeNB 306. Alternatively, the HeNB 306 may send the first Q Factor to a UE 304 at any point after the HeNB 306 has determined the Q Factor. The HeNB 306 may send 506 the value of the first Q Factor using the broadcast channel. Alternatively, the HeNB 306 may send 506 the value of the first Q Factor using dedicated signaling. A UE 304 may receive the first Q Factor over the broadcast channel in connected mode and/or in idle mode. The contents of the broadcast channel may be related to the system parameters.

The HeNB 306 may receive 508 a second Q Factor from one or more UEs 304. The HeNB 306 may receive 508 the second Q Factor from one or more UEs 304 that subscribe to the HeNB 306. The second Q Factor may include an indication of the source of the Q Factor. For example, the second Q Factor may include information that links the second Q Factor to an eNodeB 302. The UEs 304 may have received the second Q Factor from the eNodeB 302 when the UEs 304 previously subscribed to the eNodeB 302.

The HeNB 306 may then delay 510 for a fixed time period. The HeNB 306 may use a timer to decide a time window that the HeNB 306 may delay 510. The timer may be coordinated with the second base station. For example, the timer may be coordinated with the second base station through the core network. The HeNB 306 may then update 512 the first Q Factor using a combination of the first Q Factor and the second Q Factor. For example, the HeNB 306 may update 512 the first Q Factor using the average of the first Q Factor and the second Q Factor. Alternatively, the HeNB 306 may update 512 the first Q Factor to the value of the second Q Factor.

The HeNB 306 may update 512 the first Q Factor at the end of the time window. The second base station may also update the second Q Factor at the end of the time window. For example, if the second base station is an eNodeB 302, the eNodeB 302 may update the value of the second Q Factor at the same time as the HeNB 306 updates 512 the value of the first Q Factor. The second base station may update the value of the second Q Factor to the same value as the updated first Q Factor. Alternatively, the second base station may update the value of the second Q Factor by incrementing the second Q Factor closer to the first Q Factor. The HeNB 306 may then reestablish 514 the reselection area 316 around the HeNB 306 using the updated first Q Factor. Adjustments may be made to ensure that incrementing the first Q Factor and the second Q Factor does not produce a positive feedback loop. For example, the first Q Factor and the second Q Factor may each be modified in a manner that does not cause unstable system behavior resulting in coverage holes or overlapping coverage areas.

Figure 6:
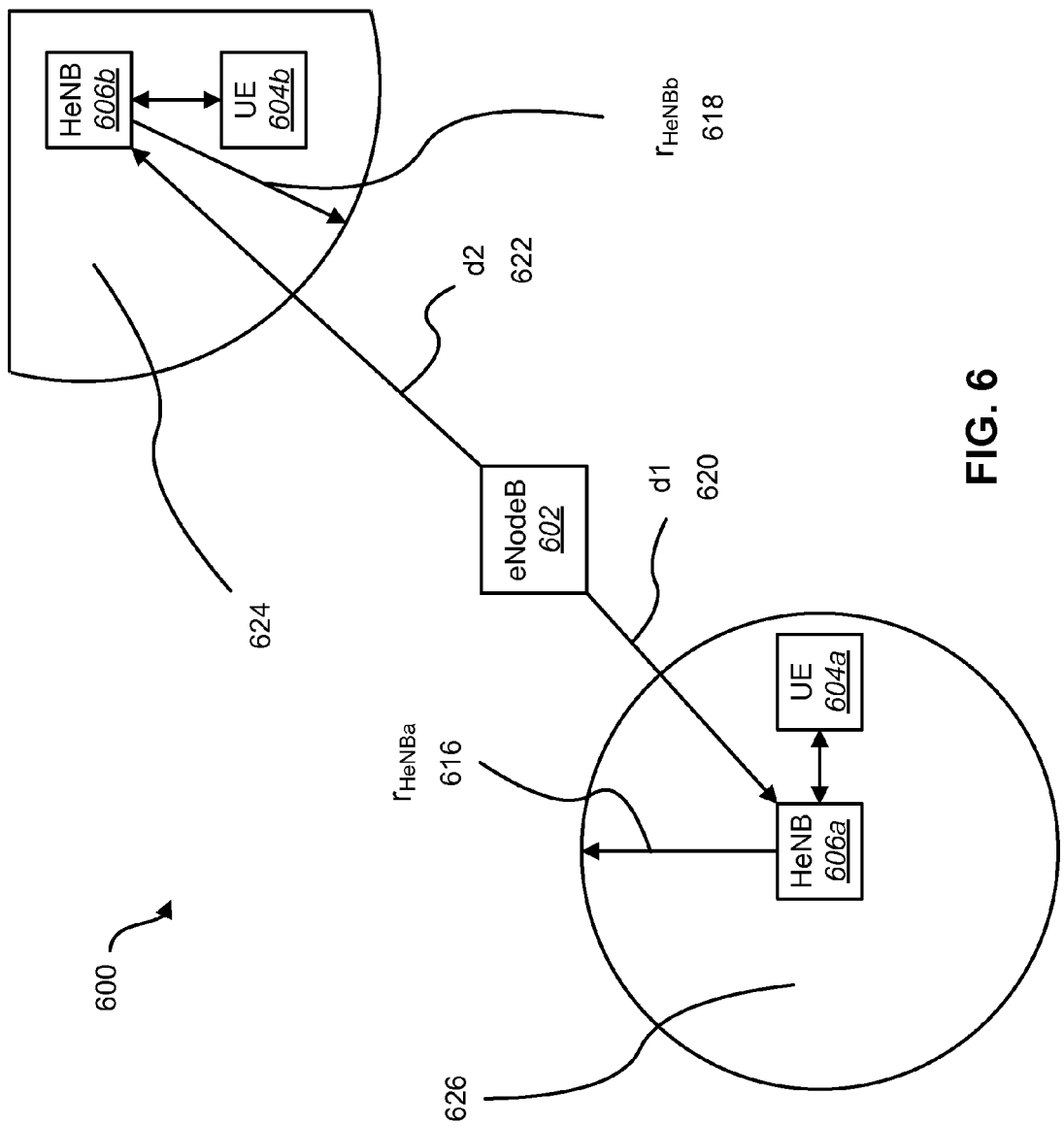
FIG. 6 is a block diagram illustrating a wireless communication system with an eNodeB, multiple HeNBs, and multiple UEs.

FIG. 6 is a block diagram illustrating a wireless communication system 600 with an eNodeB 602, multiple HeNBs 606, and multiple UEs 604. A first HeNB 606a may be located a distance d1 620 away from an eNodeB 602. The first HeNB 606a may have an established area 626 of reselection around the first HeNB 606a that is defined by the radius $r_{HeNBa}$ 616. One or more UEs 604 located within the area 626 of reselection around the first HeNB 606a may subscribe to the first HeNB 606a. A second HeNB 606b may be located a distance d2 622 away from the eNodeB 602. The second HeNB 606b may have an established area 624 of reselection around the second HeNB 606b that is defined by the radius $r_{HeNBb}$ 618. One or more UEs 604 located within the area 624 of reselection around the second HeNB 606b may subscribe to the second HeNB 606b. It may be desirable that each HeNB 606 cover the same amount of reselection area within the cell 320 covered by the eNodeB 602. Thus, it may be desirable that the radius defining the area of reselection for each HeNB 606 is constant throughout the eNodeB 602 cell 320.

If both the first HeNB 606a and the second HeNB 606b use the same transmit pilot power and the same Q Factor to define the respective reselection areas, $r_{HeNBa}$ 616 may depend on d1 620 and $r_{HeNBb}$ 618 may depend on d2 622. This is because an HeNB 606 located close to the eNodeB 602 receives more interference from the eNodeB 602 than an HeNB 606 located far away from the eNodeB 602.

Rather than adjust the Q Factor for each HeNB 606, each HeNB 606 may adapt the pilot transmit power level to compensate for the different interference levels due to the eNodeB 602 and maintain equal transmission ranges. If it is assumed that the desired range for each HeNB 606 is r and the minimum signal level required for a UE 304 at a distance r away from the HeNB 606 is Pr, then the received power may be approximated using equation (1):

$$Pr, UE = Pcsg, pilot - Pcsg, losses(r) - PenB, interference(d) \quad (1)$$

where Pcsg,pilot is the pilot transmit power of an HeNB 606, Pcsg,losses(r) is the path loss from the HeNB 606 to the UE 304 at a distance r, and PenB,interference(d) is the interference caused by an eNodeB 602 at a distance d from the HeNB 606. PenB,interference(d) can be approximated as shown in equation (2):

$$PenB, interference(d) = Penb, pilot - Penb, losses(d) \quad (2)$$

where Penb,pilot is the pilot transmit power of the eNodeB 602 and Penb,losses(d) is the path loss from the eNodeB 602 to the UE 304 at a distance d.

The path losses may be obtained using standard wireless path loss models. A path loss model may use the distance between the HeNB 606 and the eNodeB 602, the transmit power of the eNodeB 602, the frequencies used, etc. A simplistic path loss expression is given by equation (3):

$$L = 10 n \log 10^*(d) + C \quad (3)$$

where L is the loss (in dB), n is the path loss exponent (can vary between 2 and 6), d is the distance between the transmitter and the receiver, and C is a constant that accounts for system losses.

Alternatively, a more advanced radio channel model for path losses is the COST-Hata Model, which is shown by equation (4):

$$L = 46.3 + 33.9 \log f - 13.82 \log h_B - C_H + [44.9 - 6.55 \log h_B] \log d + C \quad (4)$$

$$C = \begin{cases} 0 & \text{dB for medium cities and suburban areas} \\ 3 & \text{dB for metropolitan areas} \end{cases}$$

where L is the median path loss (dB), f is the frequency of transmission (MHz), $h_B$ is the base station antenna effective height (m), d is the link distance (km), and $C_H$ is the mobile station antenna height correction factor as described in the Hata Model for Urban Areas. For small or medium sized cities, $C_H$ can be found using equation (5):

$$C_H = 0.8 + (1.1 \log f - 0.7) h_M - 1.56 \log f \quad (5)$$

For large cities, $C_H$ can be found using equation (6):

$$C_H = \begin{cases} 8.29 (\log(1.54 h_M))^2 - 1.1, & \text{if } 150 \le f \le 200 \\ 3.2 (\log(11.75 h_M))^2 - 4.97, & \text{if } 200 < f \le 1500 \end{cases} \quad (6)$$

Once the HeNB 606 has calculated the estimated path loss, the HeNB 606 may update the pilot transmission power to cover a specific range around the HeNB 606. The HeNB 606 may thus adopt a pilot transmission power that will set the reselection area according to the cell parameters, thereby ensuring that each HeNB 606 within a cell 320 has the same reselection area 316 size.

In wireless technologies, such as those currently existing and those developed in the future, where the HeNB 606 is able to detect transmissions from the eNodeB 602 and the eNodeB 602 uses a fixed or known transmit power, the HeNB 606 may deduce the value of PenB,interference(d) from the received eNodeB 602 transmissions. The HeNB 606 may then calculate Pcsg,pilot using equation (1) above to maintain an equal transmission range with other HeNBs 606 in the cell 320.

If the HeNB 606 is unable to estimate the distance between the eNodeB 602 and the HeNB 606, and the HeNB 606 is unable to detect transmissions from the eNodeB 602, the HeNB 606 may solicit additional feedback from one or more UEs 304 that subscribe to the HeNB 606. A UE 304 that subscribes to the HeNB 606 may receive the pilot signal from the eNodeB 602. The UE 304 may then feedback to the HeNB 606 the reference signal received power that the UE 304 has received from the eNodeB 602. Alternatively, the UE 304 may use the reference signal received power from the eNodeB 602 to calculate the distance between the UE 304 and the eNodeB 602. The UE 304 may then feedback the distance to the HeNB 606.

If the HeNB 606 receives the reference signal received power from the UE 304, the HeNB 606 may use this as PenB,interference(d) in equation (1) to estimate the transmit pilot power of the HeNB 606, Pcsg,pilot. If the HeNB 606 receives the distance between the UE 304 and the eNodeB 602 from the UE 304, the HeNB 606 may use this value to calculate PeNB,interference(d) of equation (2). This may be done using the simplistic path loss expression of equation (3), the COST-Hata model of equation (4), or another path loss model. Other path loss models besides those mentioned herein may also be used. The HeNB 606 may then use the value of PenB,interference(d) in equation (1) to estimate the transmit pilot power of the HeNB 606, Pcsg,pilot to maintain an equal transmission range with other HeNBs 606 in the cell 320.

Figure 7:
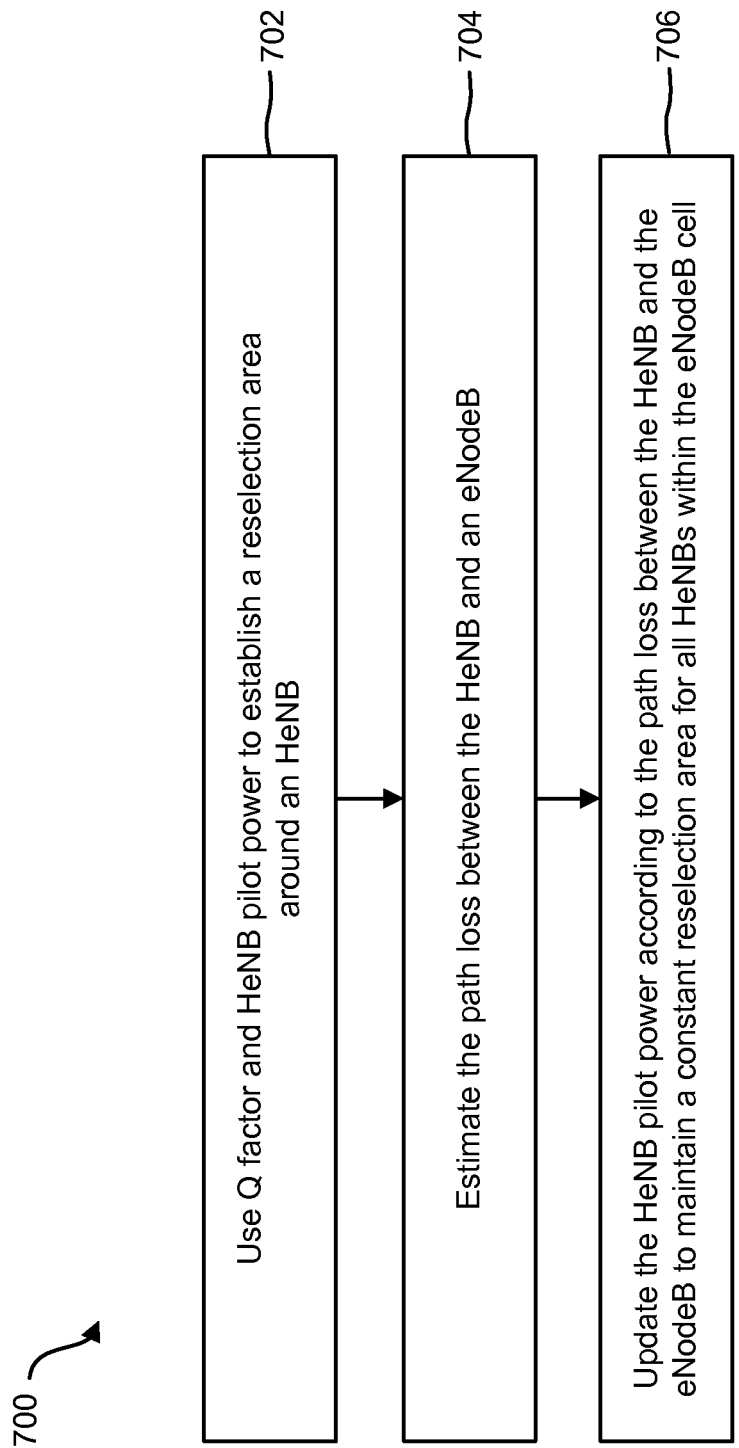
FIG. 7 is a flow diagram illustrating a method for adaptive pilot power transmission to maintain a constant range for HeNBs in a cell.

FIG. 7 is a flow diagram illustrating a method 700 for adaptive pilot power transmission to maintain a constant range for HeNBs 606 in a cell 320. An HeNB 606 may use 702 a Q Factor and the HeNB 606 pilot power to establish a reselection area 316 around the HeNB 606. The HeNB 606 may then estimate 704 the path loss between the HeNB 606 and an eNodeB 602. The HeNB 606 may update 706 the HeNB 606 pilot power according to the path loss between the HeNB 606 and the eNodeB 602 to maintain a constant reselection area 316 for all HeNBs 606 within the eNodeB 602 cell 320. Alternatively, if the separation distance between the HeNB 606 and the eNodeB 602 is known, the HeNB 606 may update 706 the HeNB 606 pilot power according to the known separation distance to maintain a constant reselection area 316 for all HeNBs 606 within the eNodeB 602 cell 320. The separation distance between the HeNB 606 and the eNodeB 602 may be known from information received from the core network.

Figure 8:
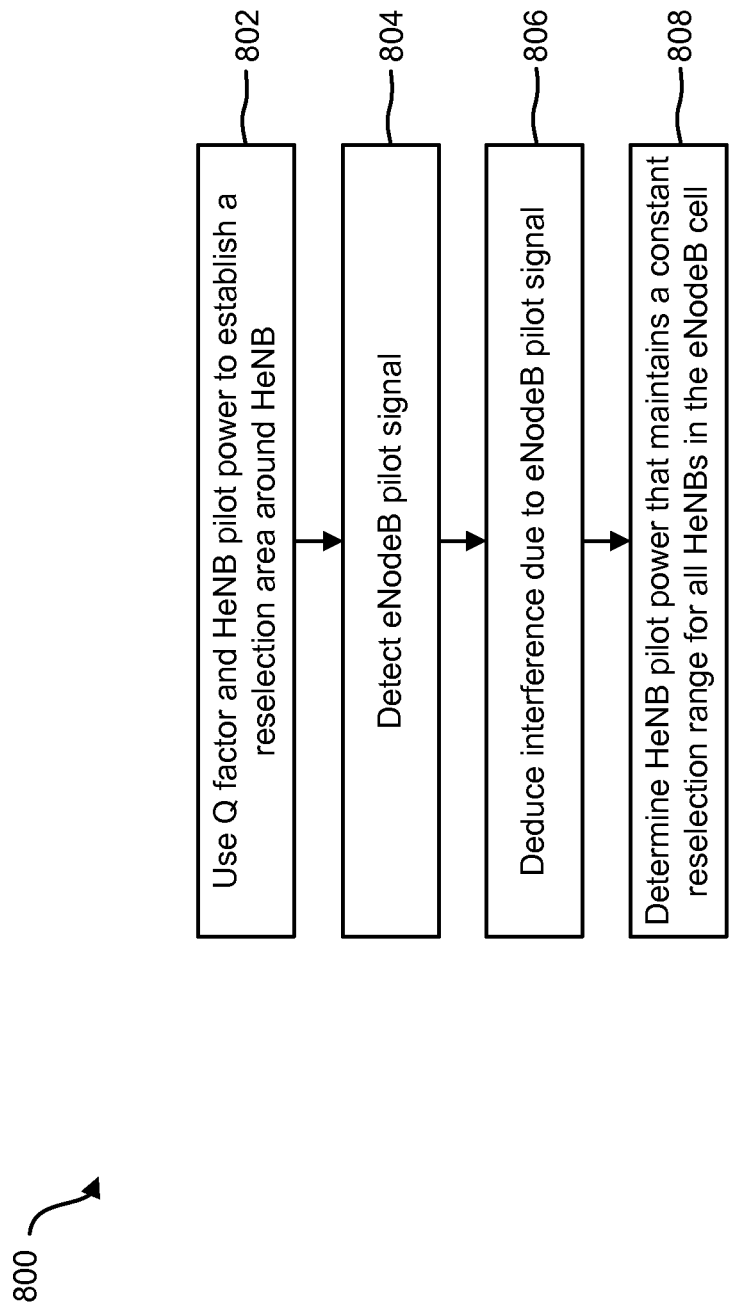
FIG. 8 is a flow diagram illustrating an alternative method for adaptive pilot power transmission to maintain a constant range for HeNBs in a cell.

FIG. 8 is a flow diagram illustrating an alternative method 800 for adaptive pilot power transmission to maintain a constant range for HeNBs 606 in a cell 320. An HeNB 606 may use 802 a Q Factor and the HeNB 606 pilot power to establish a reselection area 316 around the HeNB 606. The HeNB 606 may then detect 804 the eNodeB 602 pilot signal. The HeNB 606 may deduce 806 the interference that is due to the eNodeB 602 pilot signal. The HeNB 606 may then determine 808 the HeNB 606 pilot power that maintains a constant reselection range 316 for all HeNBs 606 within the cell 320.

Figure 9:
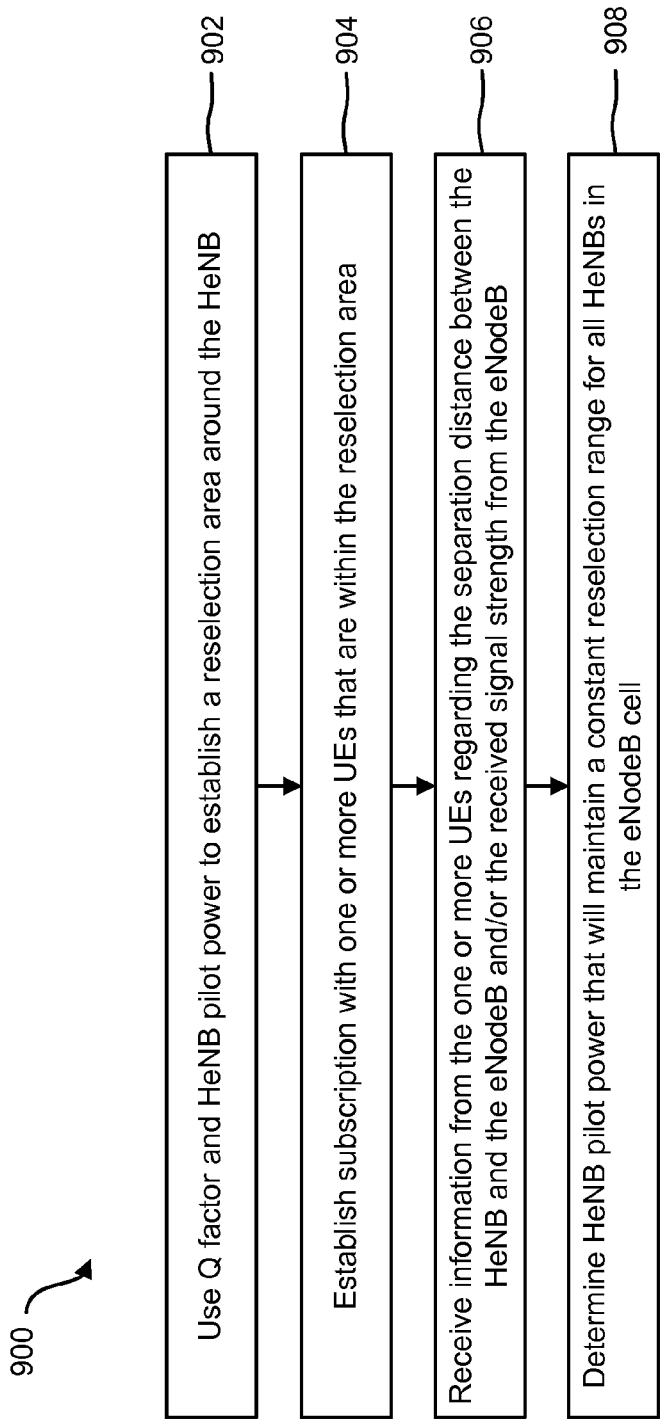
FIG. 9 is a flow diagram illustrating another method for adaptive pilot power transmission to maintain a constant range for HeNBs in a cell.

FIG. 9 is a flow diagram illustrating another method 900 for adaptive pilot power transmission to maintain a constant range for HeNBs 606 in a cell 320. An HeNB 606 may use 902 a Q Factor and the HeNB 606 pilot power to establish a reselection area 316 around the HeNB 606. The HeNB 404 may establish 904 a subscription with one or more UEs 304 that are within the reselection area 316 of the HeNB 606. The HeNB 606 may receive 906 information from one or more UEs 304 regarding the separation distance between the HeNB 306 and the eNodeB 602 and/or the received signal strength from the eNodeB 602. It is assumed that a UE 304 which subscribes to an HeNB 306 is close enough to the HeNB 306 and far enough away from the eNodeB 302 such that the distance between the UE 304 and the eNodeB 302 is similar to the distance between the HeNB 306 and the eNodeB 302. The HeNB 606 may then determine 908 the HeNB 606 pilot power that will maintain a constant reselection range 316 for all HeNBs 606 in the cell 320.

Figure 10:
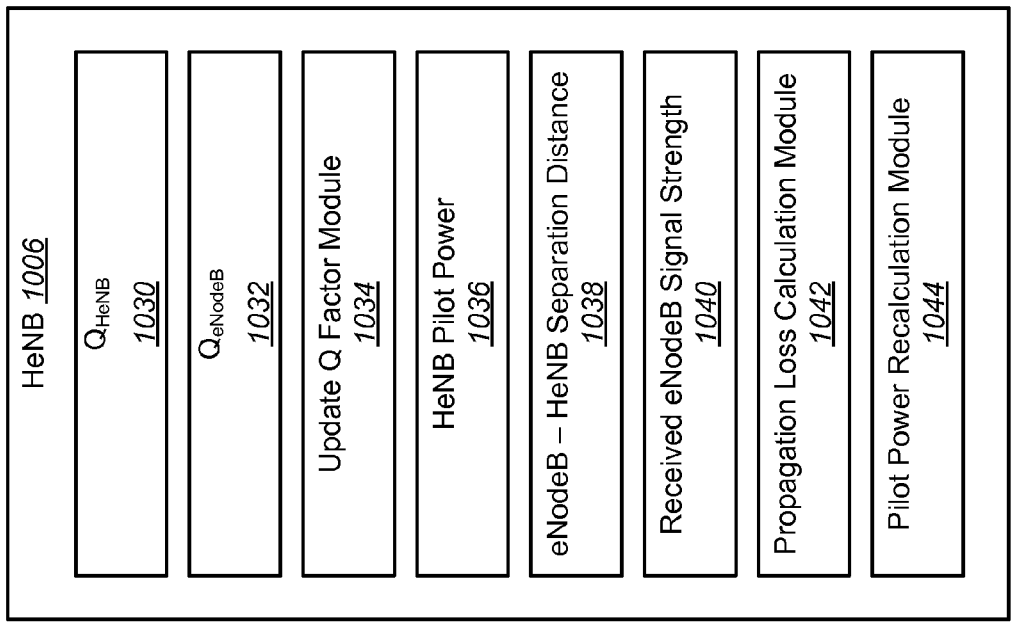
FIG. 10 is a block diagram illustrating the components and settings of an HeNB.

FIG. 10 is a block diagram illustrating the components and settings of an HeNB 1006. The HeNB 1006 may include the current Q Factor, $Q_{HeNB}$ 1030. As discussed above, $Q_{HeNB}$ 1030 may define the reselection area 316 around the HeNB 1006 from the perspective of the HeNB 1006. The HeNB 1006 may also include the Q Factor received from an eNodeB 602, $Q_{eNodeB}$ 1032. As discussed above, $Q_{eNodeB}$ 1032 may define the reselection area 316 around the HeNB 1006 from the perspective of the eNodeB 602. Alternatively, the HeNB 1006 may include the Q Factor received from another HeNB (not shown).

The HeNB 1006 may include an update Q factor module 1034. The update Q Factor module 1034 may use a received Q Factor to update the current Q Factor. For example, the update Q Factor module 1034 may use $Q_{HeNB}$ 1030 and $Q_{eNodeB}$ 1032 to update $Q_{HeNB}$ 1030. The update Q Factor module 1034 may use various algorithms to update $Q_{HeNB}$ 1030.

The HeNB 1006 may also include the HeNB pilot power 1036 that the HeNB 1006 uses to communicate with one or more UEs 304. The HeNB 1006 may further include the eNodeB-HeNB separation distance 1038. The eNodeB-HeNB separation distance 1038 may be a known value or the eNodeB-HeNB separation distance 1038 may be calculated by either the HeNB 1006 or a UE 304. The HeNB 1006 may also include the received eNodeB signal strength 1040. The HeNB 1006 may detect the eNodeB signal strength 1040 directly. Alternatively, the HeNB 1006 may receive the eNodeB signal strength 1040 from a UE 304 that has detected the eNodeB signal strength 1040.

The HeNB 1006 may include a propagation loss calculation module 1042. The propagation loss calculation module 1042 may use calculation algorithms such as those found in equations (3)-(6) above to calculate the interference at a UE 304 due to the eNodeB 602 transmission signals. The HeNB 1006 may also include a pilot power recalculation module 1044. The pilot power recalculation module 1044 may estimate the HeNB pilot power 1036 that will maintain a constant reselection area 316 of the HeNB 1006 when compared to the other HeNBs 1006 within a cell 320. For example, the pilot power recalculation module 1044 may use equation (1) above to estimate the HeNB pilot power 1036 that will maintain the constant reselection area 316 of the HeNB 1006.

Figure 11:
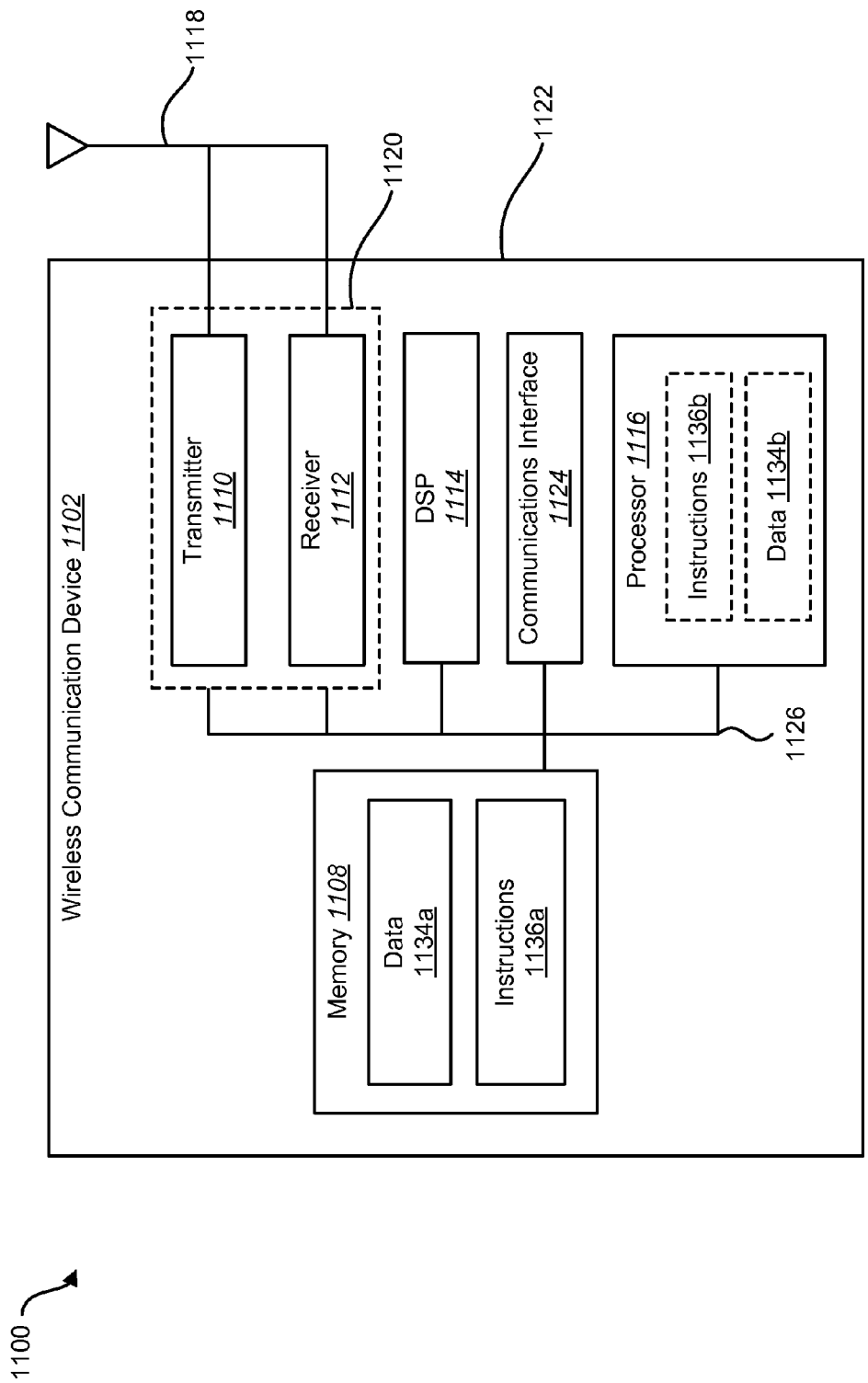
FIG. 11 is a block diagram of a wireless communication device in accordance with one configuration of the described systems and methods.

FIG. 11 is a block diagram of a wireless communication device 1102 in accordance with one configuration of the described systems and methods. The wireless communication device 1102 may be an eNodeB 102, a UE 104, an HeNB 106, or the like. The wireless communication device 1102 may include a transceiver 1120 that includes a transmitter 1110 and a receiver 1112. The transceiver 1120 may be coupled to one or more antennas 1118. The wireless communication device 1102 may further include a digital signal processor (DSP) 1114, a general purpose processor 1116, memory 1108, and a communications interface 1124. The various components of the wireless communication device 1102 may be included within a housing 1122.

The processor 1116 may control operation of the wireless communication device 1102. The processor 1116 may also be referred to as a CPU. The memory 1108, which may include both read-only memory (ROM) and random access memory (RAM), provides instructions 1136*a* and data 1134*a* to the processor 1116. A portion of the memory 1108 may also include non-volatile random access memory (NVRAM). The memory 1108 may include any electronic component capable of storing electronic information, and may be embodied as ROM, RAM, magnetic disk storage media, optical storage media, flash memory, on-board memory included with the processor 1116, EPROM memory, EEPROM memory, registers, a hard disk, a removable disk, a CD-ROM, etc.

The memory 1108 may store program instructions 1136*a* and other types of data 1134*a*. The program instructions 1136*a* may be executed by the processor 1116 to implement some or all of the methods disclosed herein. The processor 1116 may also use the data 1134*a* stored in the memory 1108 to implement some or all of the methods disclosed herein. As a result, instructions 1136*b* and data 1134*b* may be loaded and/or otherwise used by the processor 1116.

In accordance with the disclosed systems and methods, the antenna 1118 may receive signals that have been transmitted from a nearby communications device, such as a UE 104, an eNodeB 102, or an HeNB 106. The antenna 1118 provides these received signals to the transceiver 1120 which filters and amplifies the signals. The signals are provided from the transceiver 1120 to the DSP 1114 and to the general purpose processor 1116 for demodulation, decoding, further filtering, etc.

The various components of the wireless communication device 1102 are coupled together by a bus system 1126, which may include a power bus, a control signal bus, and a status signal bus in addition to a data bus. However, for the sake of clarity, the various busses are illustrated in FIG. 11 as the bus system 1126.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for adaptive pilot power transmission for a home evolved NodeB (HeNB) in a cell, the method comprising:
    establishing, by the HeNB, a re-selection area around the HeNB in accordance with an offset factor, an HeNB pilot power level of the HeNB, and a path loss;
    measuring, by the HeNB, a pilot power of a pilot signal received from a macro evolved NodeB (eNodeB);
    estimating, by the HeNB, an updated path loss in accordance with the measured pilot power; and
    adjusting, by the HeNB, the HeNB pilot power level in accordance with the updated path loss in order to maintain the re-selection area around the HeNB without adjusting the offset factor,
    wherein adjusting the HeNB pilot power level in accordance with the updated path loss in order to maintain the re-selection area around the HeNB without adjusting the offset factor comprises adjusting the HeNB pilot power level to maintain a radius of the re-selection area above or below a threshold.

2. The method of claim 1, wherein the path loss and the updated path loss correspond to a path extending between the HeNB and the macro eNode B.

3. The method of claim 1, wherein the path loss and the updated path loss correspond to a path extending between the HeNB and the UE.

4. The method of claim 1, wherein adjusting the HeNB pilot power level to maintain the re-selection area around the HeNB comprises:
    adjusting the HeNB pilot power level to maintain a radius of the re-selection area within a range.

5. The method of claim 1, wherein adjusting the HeNB pilot power level to maintain the re-selection area around the HeNB comprises:
    adjusting the HeNB pilot power level to compensate for the updated path loss being different than the path loss.

6. The method of claim 1, wherein adjusting the HeNB pilot power level to maintain the re-selection area around the HeNB comprises:
    adjusting the HeNB pilot power level in accordance with the following equation:

$$Pr, \text{UE} = Pcsg, \text{pilot} - Pcsg, \text{losses}(r) - \text{Pen}B, \text{interference}(d),$$

where Pr,UE is a receive power of the UE, Pcsg,pilot is a pilot transmit power of an HeNB, Pcsg,losses(r) is a path loss from the HeNB to the UE at a distance r, and PenB,interference(d) is an interference caused by the eNodeB at a distance d from the HeNB.

7. A method for adaptive pilot power transmission for a home evolved NodeB (HeNB) in a cell, the method comprising:
   establishing, by the HeNB, a re-selection area around the HeNB in accordance with an offset factor, an HeNB pilot power level, and a path loss;
   receiving, by the HeNB, measurement reports from a user equipment (UE), wherein the measurement reports indicate a measured interference resulting from transmissions of a macro evolved NodeB (eNodeB);
   estimating, by the HeNB, an updated path loss in accordance with the measured interference; and
   adjusting, by the HeNB, a HeNB pilot power of the HeNB in accordance with the updated path loss in order to maintain the re-selection area around the HeNB without adjusting the offset factor,
   wherein adjusting HeNB pilot power of the HeNB in accordance with the updated path loss in order to maintain the re-selection area around the HeNB without adjusting the offset factor comprises adjusting the HeNB pilot power level to maintain a radius of the re-selection area above or below a threshold.

8. The method of claim 7, wherein the path loss and the updated path loss correspond to a path extending between the HeNB and the macro eNode B.

9. The method of claim 7, wherein the path loss and the updated path loss correspond to a path extending between the HeNB and the UE.

10. The method of claim 7, wherein adjusting the HeNB pilot power level to maintain the re-selection area around the HeNB comprises:
   adjusting the HeNB pilot power level to maintain a radius of the re-selection area within a range.

11. The method of claim 7, wherein adjusting the HeNB pilot power level to maintain the re-selection area around the HeNB comprises:
   adjusting the HeNB pilot power level to compensate for the updated path loss being different than the path loss.

12. The method of claim 7, wherein adjusting the HeNB pilot power level to maintain the re-selection area around the HeNB comprises:
   adjusting the HeNB pilot power level in accordance with the following equation:

$$Pr,\text{UE} = P\text{csg,pilot} - P\text{csg,losses}(r) - \text{Pen}B,\text{interference}(d),$$

where Pr,UE is a receive power of the UE, Pcsg,pilot is the pilot transmit power of an HeNB, Pcsg,losses(r) is a path loss from the HeNB to the UE at a distance r, and PenB,interference(d) is an interference caused by the eNodeB at a distance d from the HeNB.

13. A home evolved NodeB (HeNB) comprising:
   a first unit configured to establish a re-selection area around the HeNB in accordance with an offset factor, an HeNB pilot power level of the HeNB, and a path loss;
   a measurement unit, in the HeNB, configured to measure a pilot power of a pilot signal received from a macro evolved NodeB (eNodeB);
   a second unit configured to estimate an updated path loss in accordance with the measured pilot power; and
   an adjustment unit configured to adjust the HeNB pilot power level in accordance with the updated path loss in order to maintain the re-selection area around the HeNB without adjusting the offset factor,
   the adjustment unit being configured to adjust the HeNB pilot power level in accordance with the updated path loss in order to maintain the re-selection area around the HeNB without adjusting the offset factor by adjusting the HeNB pilot power level to maintain a radius of the re-selection area above or below a threshold.

14. The HeNB of claim 13, wherein the path loss and the updated path loss correspond to a path extending between the HeNB and the macro eNode B.

15. The HeNB of claim 13, wherein the path loss and the updated path loss correspond to a path extending between the HeNB and the UE.

16. The HeNB of claim 13, wherein the adjustment unit is further configured to:
   adjust the HeNB pilot power level to maintain a radius of the re-selection area within a range.

17. The HeNB of claim 13, wherein the adjustment unit is further configured to:
   adjust the HeNB pilot power level to compensate for the updated path loss being different than the path loss.

18. The HeNB of claim 13, wherein the adjustment unit is further configured to:
   adjust the HeNB pilot power level in accordance with the following equation:

$$Pr,\text{UE} = P\text{csg,pilot} - P\text{csg,losses}(r) - \text{Pen}B,\text{interference}(d),$$

where Pr,UE is a receive power of the UE, Pcsg,pilot is the pilot transmit power of an HeNB, Pcsg,losses(r) is a path loss from the HeNB to the UE at a distance r, and PenB,interference(d) is an interference caused by the eNodeB at a distance d from the HeNB.

19. A communications apparatus comprising:
   a first unit configured to establish a re-selection area around a home evolved NodeB (HeNB) in accordance with an offset factor, an HeNB pilot power level of the HeNB, and a path loss;
   a receiving unit configured to receive measurement reports from a user equipment (UE), wherein the measurement reports indicate a measured interference resulting from transmissions of a macro evolved NodeB (eNodeB);
   a second unit configured to estimate an updated path loss in accordance with the measured interference; and
   an adjustment unit configured to adjust the HeNB pilot power level in accordance with the updated path loss in order to maintain the re-selection area around the HeNB without adjusting the offset factor,
   the adjustment unit being configured to adjust the HeNB pilot power level in accordance with the updated path loss in order to maintain the re-selection area around the HeNB without adjusting the offset factor by adjusting the HeNB pilot power level to maintain a radius of the re-selection area above or below a threshold.

20. The communications apparatus of claim 19, wherein the path loss and the updated path loss correspond to a path extending between the HeNB and the macro eNode B.

21. The communications apparatus of claim 19, wherein the path loss and the updated path loss correspond to a path extending between the HeNB and the UE.

22. The communications apparatus of claim 19, wherein the adjustment unit is further configured to:
   adjust the HeNB pilot power level to maintain a radius of the re-selection area within a range.

23. The communications apparatus of claim 19, wherein the adjustment unit is further configured to:
adjust the HeNB pilot power level to compensate for the updated path loss being different than the path loss.

24. The communications apparatus of claim 19, wherein the adjustment unit is further configured to:
adjust the HeNB pilot power level in accordance with the following equation:

$$Pr,UE=Pcsg,pilot-Pcsg,losses(r)-PenB,interference(d),$$

where Pr,UE is a receive power of the UE, Pcsg,pilot is the pilot transmit power of an HeNB, Pcsg,losses(r) is a path loss from the HeNB to the UE at a distance r, and PenB,interference(d) is an interference caused by the eNodeB at a distance d from the HeNB.

25. A non-transitory computer-readable medium having programming for execution by a processor for causing the processor to perform a method for adaptive pilot power transmission for a home evolved NodeB (HeNB) in a cell, the programming including instructions to:
establish a re-selection area around the HeNB in accordance with an offset factor, an HeNB pilot power level of the HeNB, and a path loss;
measure, by the HeNB, a pilot power of a pilot signal received from a macro evolved NodeB (eNodeB);
estimate an updated path loss in accordance with the measured pilot power; and
adjust the HeNB pilot power level of the HeNB in accordance with the updated path loss in order to maintain the re-selection area around the HeNB without adjusting the offset factor,
wherein the instructions to adjust the HeNB pilot power level to maintain the re-selection area around the HeNB without adjusting the offset factor include instructions to adjust the HeNB pilot power level to maintain a radius of the re-selection area above or below a threshold.

26. The non-transitory computer-readable medium of claim 25, wherein the path loss and the updated path loss correspond to a path extending between the HeNB and the macro eNode B.

27. The non-transitory computer-readable medium of claim 25, wherein the path loss and the updated path loss correspond to a path extending between the HeNB and the UE.

28. The non-transitory computer-readable medium of claim 25, wherein the instructions to adjust the HeNB pilot power level to maintain the re-selection area around the HeNB include instructions to:
adjust the HeNB pilot power level to maintain a radius of the re-selection area within a range.

29. The non-transitory computer-readable medium of claim 25, wherein the instructions to adjust the HeNB pilot power level to maintain the re-selection area around the HeNB include instructions to:
adjust the HeNB pilot power level to compensate for the updated path loss being different than the path loss.

30. The non-transitory computer-readable medium of claim 25, wherein the instructions to adjust the HeNB pilot power level to maintain the re-selection area around the HeNB include instructions to:
adjust the HeNB pilot power level in accordance with the following equation:

$$Pr,UE =Pcsg,pilot-Pcsg,losses(r)-PenB,interference(d),$$

where Pr,UE is a receive power of the UE, Pcsg,pilot is the pilot transmit power of an HeNB, Pcsg,losses(r) is a path loss from the HeNB to the UE at a distance r, and PenB,interference(d) is an interference caused by the eNodeB at a distance d from the HeNB.

31. A non-transitory computer-readable medium having programming for execution by a processor for causing the processor to perform a method for adaptive pilot power transmission for a home evolved NodeB (HeNB) in a cell, the programming including instructions to:
establish a re-selection area around the HeNB in accordance with an offset factor, an HeNB pilot power level of the HeNB, and a path loss;
receive measurement reports from a user equipment (UE), wherein the measurement reports indicate a measured interference resulting from transmissions of a macro evolved NodeB (eNodeB);
estimate an updated path loss in accordance with the measured interference; and
adjust a HeNB pilot power level of the HeNB in accordance with the updated path loss in order to maintain the re-selection area around the HeNB without adjusting the offset factor,
wherein the instructions to adjust the HeNB pilot power level of the HeNB in accordance with the updated path loss in order to maintain the re-selection area around the HeNB without adjusting the offset factor include instructions to adjust the HeNB pilot power level to maintain a radius of the re-selection area above or below a threshold.

32. The non-transitory computer-readable medium of claim 31, wherein the path loss and the updated path loss correspond to a path extending between the HeNB and the macro eNode B.

33. The non-transitory computer-readable medium of claim 31, wherein the path loss and the updated path loss correspond to a path extending between the HeNB and the UE.

34. The non-transitory computer-readable medium of claim 31, wherein the instructions to adjust the HeNB pilot power level to maintain the re-selection area around the HeNB include instructions to:
adjust the HeNB pilot power level to maintain a radius of the re-selection area within a range.

35. The non-transitory computer-readable medium of claim 31, wherein the instructions to adjust the HeNB pilot power level to maintain the re-selection area around the HeNB include instructions to:
reduce the HeNB pilot power level to compensate for the updated path loss being less than the path loss.

36. The non-transitory computer-readable medium of claim 31, wherein the instructions to adjust the HeNB pilot power level to maintain the re-selection area around the HeNB include instructions to:
increase the HeNB pilot power level to compensate for the updated path loss being greater than the path loss.

37. The non-transitory computer-readable medium of claim 31, wherein the instructions to adjust the HeNB pilot power level to maintain the re-selection area around the HeNB include instructions to:
adjust the HeNB pilot power level in accordance with the following equation:

$$Pr,UE=Pcsg,pilot-Pcsg,losses(r)-PenB,interference(d),$$

where Pr,UE is a receive power of the UE, Pcsg,pilot is the pilot transmit power of an HeNB, Pcsg,losses(r) is a path loss from the HeNB to the UE at a distance r, and PenB,interference(d) is an interference caused by the eNodeB at a distance d from the HeNB.

\* \* \* \* \*